(12) United States Patent
Watanabe et al.

(10) Patent No.: US 7,697,386 B2
(45) Date of Patent: Apr. 13, 2010

(54) OPTICAL RECORDING EQUIPMENT

(75) Inventors: Koichi Watanabe, Hachioji (JP);
Hiroyuki Minemura, Kokubunji (JP)

(73) Assignees: Hitachi, Ltd. (JP); Hitachi- LG Data Storage, Inc. (JP)

( * ) Notice: Subject to any disclaimer, the term of this patent is extended or adjusted under 35 U.S.C. 154(b) by 865 days.

(21) Appl. No.: 11/330,218

(22) Filed: Jan. 12, 2006

(65) Prior Publication Data
US 2006/0215514 A1 Sep. 28, 2006

(30) Foreign Application Priority Data
Mar. 25, 2005 (JP) .............................. 2005-087470

(51) Int. Cl.
*G11B 7/0045* (2006.01)
(52) U.S. Cl. ............... 369/47.53; 369/53.27; 369/59.16
(58) Field of Classification Search ................ 369/47.5, 369/47.51, 47.53, 53.26, 53.27, 116, 59.11, 369/59.16
See application file for complete search history.

(56) References Cited

U.S. PATENT DOCUMENTS

| | | | | |
|---|---|---|---|---|
| 5,790,482 A * | 8/1998 | Saga et al. | ................ | 369/13.27 |
| 6,510,116 B1 * | 1/2003 | Miyagawa et al. | ....... | 369/59.12 |
| 6,611,481 B1 * | 8/2003 | Koishi et al. | ............. | 369/47.53 |
| 6,781,937 B2 * | 8/2004 | Nakajo | ..................... | 369/59.12 |
| 6,985,419 B2 * | 1/2006 | Ikeda et al. | .............. | 369/53.23 |
| 7,085,429 B2 * | 8/2006 | Sasa | .......................... | 382/272 |
| 2002/0024903 A1 * | 2/2002 | Sato | ......................... | 369/47.53 |
| 2003/0031108 A1 * | 2/2003 | Furumiya et al. | ........ | 369/59.12 |
| 2003/0067857 A1 | 4/2003 | Shirota et al. | | |
| 2003/0151994 A1 * | 8/2003 | Tasaka et al. | ............ | 369/47.53 |
| 2003/0156514 A1 * | 8/2003 | Suzuki | .................... | 369/47.53 |
| 2004/0145993 A1 | 7/2004 | Kurebayashi et al. | | |
| 2004/0223434 A1 * | 11/2004 | Nishimura et al. | ....... | 369/47.53 |
| 2005/0063268 A1 * | 3/2005 | Ninomiya | ................ | 369/47.53 |

FOREIGN PATENT DOCUMENTS

| | | |
|---|---|---|
| JP | 2003-085753 | 3/2003 |
| JP | 2004-234699 | 8/2004 |

* cited by examiner

*Primary Examiner*—Wayne R Young
*Assistant Examiner*—Thomas D Alunkal
(74) *Attorney, Agent, or Firm*—Antonelli, Terry, Stout & Kraus, LLP.

(57) ABSTRACT

In a recording system in which linear velocity during the write operation changes, it is difficult to obtain write strategy parameters in every linear velocity with trial writing. The optimum write strategy condition under the high speed or low speed operation is obtained with trial writing or the like and a value of power compensation is obtained from the frequency characteristic stored in the table. Fluctuation in performance of optical disk drive, deterioration by aging, and temperature characteristic can be compensated.

16 Claims, 18 Drawing Sheets

LDD register instruction table

| | | table | | |
|---|---|---|---|---|
| | | (a) | (b) | (c) |
| Pulse width | 1.5ns | C | D | E |
| | 2ns | B | C | D |
| | 2.5ns | A | B | C |

LDD power register setup value

FIG. 12

|  | First pulse | Last pulse |
|---|---|---|
| Pulse width | 3ns | 2ns |
| Initial register value | A | A |
| Register value after compensation of the frequency characteristic of driver | A | B |

Frequency characteristics of laser driver

Relation of Frequency (F) and pulse width (W)

$F \propto 1/W$

FIG. 16

Temperature is always measured during drive operation.
201

If a temperature change is detected, a frequency characteristic will be referred to from the temperature table. 202

The present writing parameter is verified 203

The frequency characteristics of 202 is considered and rewriting of the required register of compensation by using pulse width in 203 parameters

FIG. 17

|  | Temperature 20°C | Temperature 40°C | Temperature 60°C | Temperature 80°C |
|---|---|---|---|---|
| Pulse width | 2ns | 2ns | 2ns | 2ns |
| Register value after compensation of the frequency characteristic of driver | A | B | C | D |

OPTICAL RECORDING EQUIPMENT

CLAIM OF PRIORITY

The present application claims priority from Japanese application JP 2005-087470 filed on Mar. 25, 2005, the content of which is hereby incorporated by reference into this application.

FIELD OF THE INVENTION

The present invention relates to an optical disk drive such as CD-R drive, CD-RW drive, DVD-R drive, DVD-RW drive, DVD-RAM drive, Blu-ray disk drive, and HD DVD drive and an optical recording method for driving and controlling optical modulation waveforms for recording information to an information recording medium.

BACKGROUND OF THE INVENTION

With continuous improvement in recording capacity of an optical disk drive for recording, a variety of products such as conventional CD using the infrared laser (wavelength: 780 nm), DVD using the red-color laser (wavelength: 650 nm), Blu-ray disk (BD) and High Density (HD)-DVD using blue-color laser (450 nm) have been put into the market.

For example, the write strategy technology (refer to write strategy illustrated in FIG. 5) used for the DVD-RAM utilizes a plurality of laser pulses having three kinds of power level. Three kinds of power level can be sequentially classified, from the higher level, into the write power (Pw), gap power (Pg), and erase power (Pe). When an optical disk is irradiated with the laser beam of write power, recording film of the optical disk is fused. Thereafter, when the optical disk is cooled rapidly, the optical disk gets the amorphous (non-crystal) state and its light reflectivity is lowered. Such lowered reflectivity is utilized as a recording mark. Moreover, when the optical disk is irradiated with the laser beam of erase power, the recording film of optical disk gets the crystal state. A part of the optical disk in the amorphous state before irradiation of laser beam gets the crystal state and a part of the optical disk which has been initially in the crystal state is left as the crystal state. Therefore, the recording mark can be erased.

The recording strategy includes a rectangular mono-pulse employed in the CD-R, DVD-R (refer to FIG. 8), a comb type multi-pulse employed in the CD-RW, DVD-RW, DVD-RAM (refer to FIG. 5) and castle type (non-multi type) recording pulse employed for high multiple speed recording of optical disk of the DVD system (refer to FIG. 6).

The values for determining edge timing of the write strategy illustrated in FIGS. 5, 6, and 8 and the values (for example, Pw, Pg, Pe) for determining recording powers such as Pw and Pe are called write parameters. These write parameters are previously recorded as the optimum values for each recording medium. For example, in the case of DVD-RAM, these parameters are recorded in the physical format information (PFI) area within the control data zone provided in the lead in area at the inner circumference. The reason is that the optimum value of the recording parameter group is different in accordance with composition and material or the like of a recording medium.

Namely, on the occasion of recording the recording marks, the optimum recording marks are formed by reading the write parameters such as a value for determining edge timing of the write strategy, a value for determining recording power like Pw, Pm, and each value of shift table from the recording medium and then controlling the laser pulse using the write parameters obtained.

The write strategy technology explained above is described in the Japanese Unexamined Patent Publication No. 2003-85753 (corresponding USP No. 2003-67857).

On the other hand, a rotation control system for recording and reproducing operations of an optical disk can roughly be classified into two kinds of system. One system Is a CLV (Constant Linear Velocity) system for controlling the rotation of disk into a constant linear velocity and the other system is a CAV (Constant Angular Velocity) system for controlling the rotation of disk into a constant angular velocity.

In the CLV system, when the linear velocity at the outer and inner circumferences of a disk in the diameter of 120 mm is set identical, the number of rotations at the inner circumference changes to about 2.5 times the velocity at the outer circumference. Therefore, the rotating velocity determined in accordance with the linear velocity at the inner circumference is considered as a bottle-neck for realization of high speed recording and reproducing operations through improvement in the linear velocity. But, in the CAV system, high speed operations can be realized easily using the linear velocity at the outermost circumference because the number of rotations is constant. However, in the CAV system, since the number of rotations is constant, the linear velocity at the inner circumference changes about 2.5 times the velocity at the outer circumference and the recording velocity also changes about 2.5 times. Accordingly, the recording parameter group is also different in the inner circumference and outer circumference. In addition, since the linear velocity changes from time to time toward the outer circumference from the inner circumference, it is required to change the write parameters from time to time in accordance with change in the radial locations. For example, in the case of DVD-RAM of 5 times velocity, the recording parameter groups in the 2 times, 3 times, and 4 times velocity are provided from a medium manufacturer. Meanwhile, in the case of conducting the recording operation with the CAV system of 2 times velocity at the inner circumference and 5 times velocity at the outer circumference using a certain drive, the optimum recording parameter group of such drive is determined for 2 times velocity at the inner circumference and 5 times velocity at the outer circumference, while the recording quality is verified, on the basis of the recording parameter group provided from the medium manufacturer (this process is described hereinafter as learning of the recording parameter) and recording operation is executed while drive individually obtains the write parameters for the intermediate velocity. In this case, however, interpolation is conducted in general between the highest velocity and lowest velocity. The technology explained above is described in the Japanese Unexamined Patent Publication No. 2004-234699 (corresponding USP No. 2004-145993).

SUMMARY OF THE INVENTION

In the case where high speed rotation of an optical disk is further improved in future, the high frequency pulse in the order of several 100 MHz to GHz order corresponding to 16 times velocity of DVD and 10 times velocity of BD will be used. For example, in the case of 16 times velocity of DVD-RAM, velocity at the inner circumference becomes 6.8 times velocity, while the velocity at the outer circumference becomes 16 times velocity in the recording by the CAV system. A narrower pulse tends to be requested when the write speed becomes higher (refer to FIG. 9). In the 16 times velocity of DVD-RAM, one window width Tw becomes about 2 ns in the 16 times velocity as the pulse width. When considering bandwidth of a laser driver used for optical disk drive and also considering that rising velocity/falling velocity tr/tf of 10 to 90% is generally about ins at present, the specified light emitting power cannot be obtained in this region (refer to FIG. 10). The reason is that when the tr/tf is 1 ns in the region of 10 to 90% thereof, the time of 1.25 times or more is simply required for 0 to 100% thereof and accordingly rising of pulse is impossible, when 1 ns or more is required for the rising in the region of 0 to 100% for the pulse width of 2 ns which results in the tr/tf of 1.25 ns. In this case, waveform is distorted, disabling recording of the predetermined marks without provision of power corresponding to deterioration of frequency as illustrated in FIG. 7. It can be considered here to compensate for such distortion that the specified value of laser driver is increased. However, amount of compensation may be assumed to be varied due to fluctuation of laser driver and fluctuation by temperature characteristic and aging.

With consideration for the background explained above, it is an object of the present invention to provide an optical recording equipment and a recording method which can compensate for frequency characteristic (meaning dependence on frequency in attenuation of amplitude) of a laser driver through the single learning based on the trial writing and also compensate for variation, temperature characteristic and deterioration by aging of the laser driver.

In order to compensate for frequency characteristic of laser driver, trial writing is conducted once at the inner circumference during the learning based on the actual drive. In this case, the trial writing is executed using at least one or more of the pulse widths corresponding to the frequency with which the frequency characteristic of laser driver is deteriorated. A difference (deterioration) between a light emitting instruction and the actual emission of light is obtained from such reading (reproducing) signal. The result of comparison is compared with a table previously including frequency characteristics of laser driver to detect the frequency characteristic of laser driver and decide amount of compensation of power for the light emitting pulse instruction width.

Moreover, according to an optical information recording method for recording information to a recording medium which realizes recording of information by forming marks on the recording layer through irradiation of laser beam, the trial writing operation is executed in a certain area between the outer circumference and the inner circumference, and a power register of laser driver is updated and set to form the predetermined waveform by making reference to the frequency table which is prepared on the basis of the detected value of frequency characteristic of the laser driver from the result of trial writing operation.

The present invention can also be adapted to the profile in which a plurality of LDs is driven with only one LD driver.

In addition, the present invention shows particular effect for high speed rotation in which importance is placed to rising edge and falling edge of the waveform. Particularly, the present invention is suitable for an optical disk storage system in which the signal can be transferred in the transfer rate of 100 Mbits per second or higher.

According to another aspect of the present invention, deterioration can be compensated with least trial writing operations for the frequency characteristic of an optical disk which is deteriorated due to fluctuation in performance of laser driver, deterioration by aging and temperature characteristic.

BRIEF DESCRIPTION OF THE DRAWINGS

FIG. 12 is a diagram illustrating update of a register in the embodiment to which the present invention is adapted.

FIG. 16 is a diagram illustrating the sequence of update of register based on temperature change during drive operation.

FIG. 17 is a diagram illustrating an example of register values in accordance with temperature characteristic.

DETAILED DESCRIPTION OF THE PREFERRED EMBODIMENTS

The preferred embodiment of the present invention will be explained below with reference to the accompanying drawings.

First Embodiment

Power Compensation (Fluctuation in Frequency Characteristic of Drive)

Figure 1:
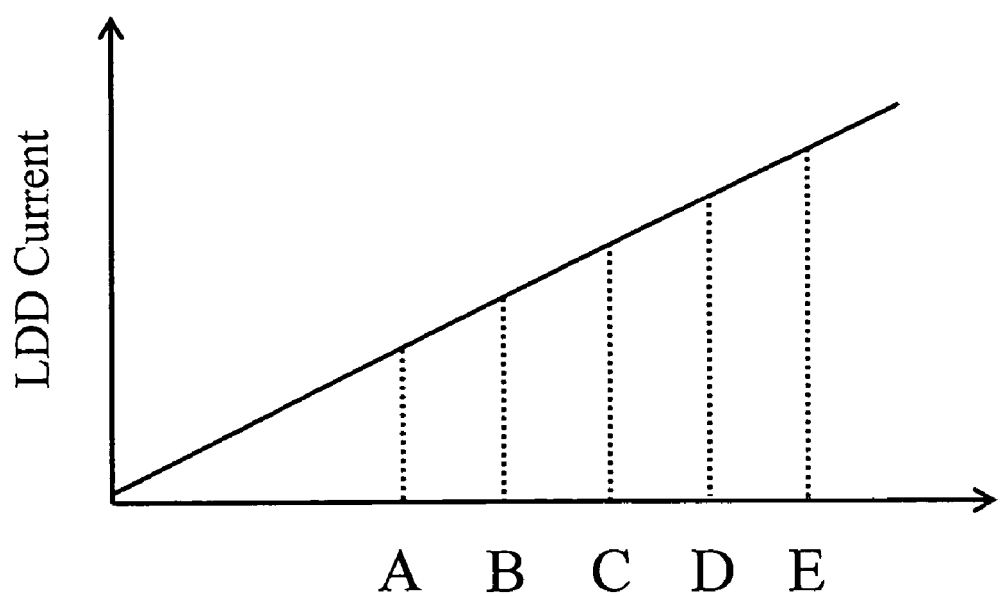
FIG. 1 illustrates relation between a laser driver frequency characteristic table and a register value in the present invention.
Figure 2:
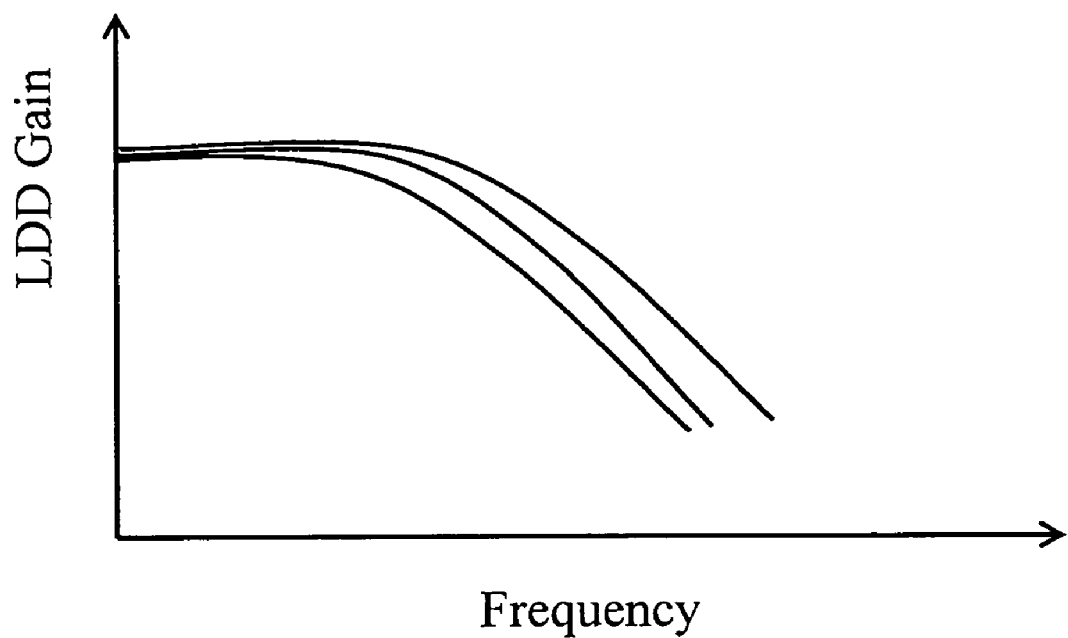
FIG. 2 illustrates fluctuation in frequency characteristic of the laser driver.
Figure 3:
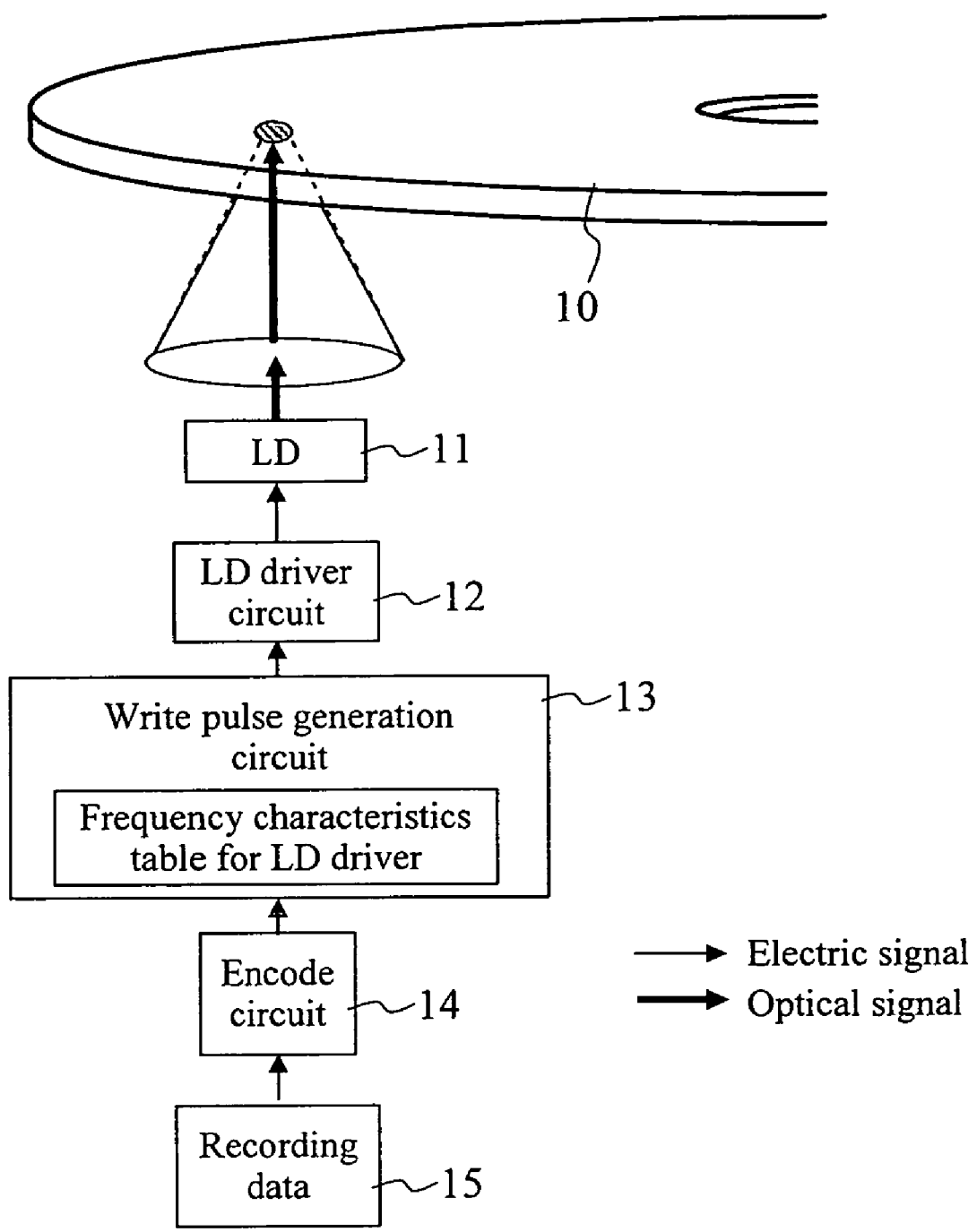
FIG. 3 is a schematic diagram illustrating flow of a recording signal until it is written into an optical disk.
Figure 4:
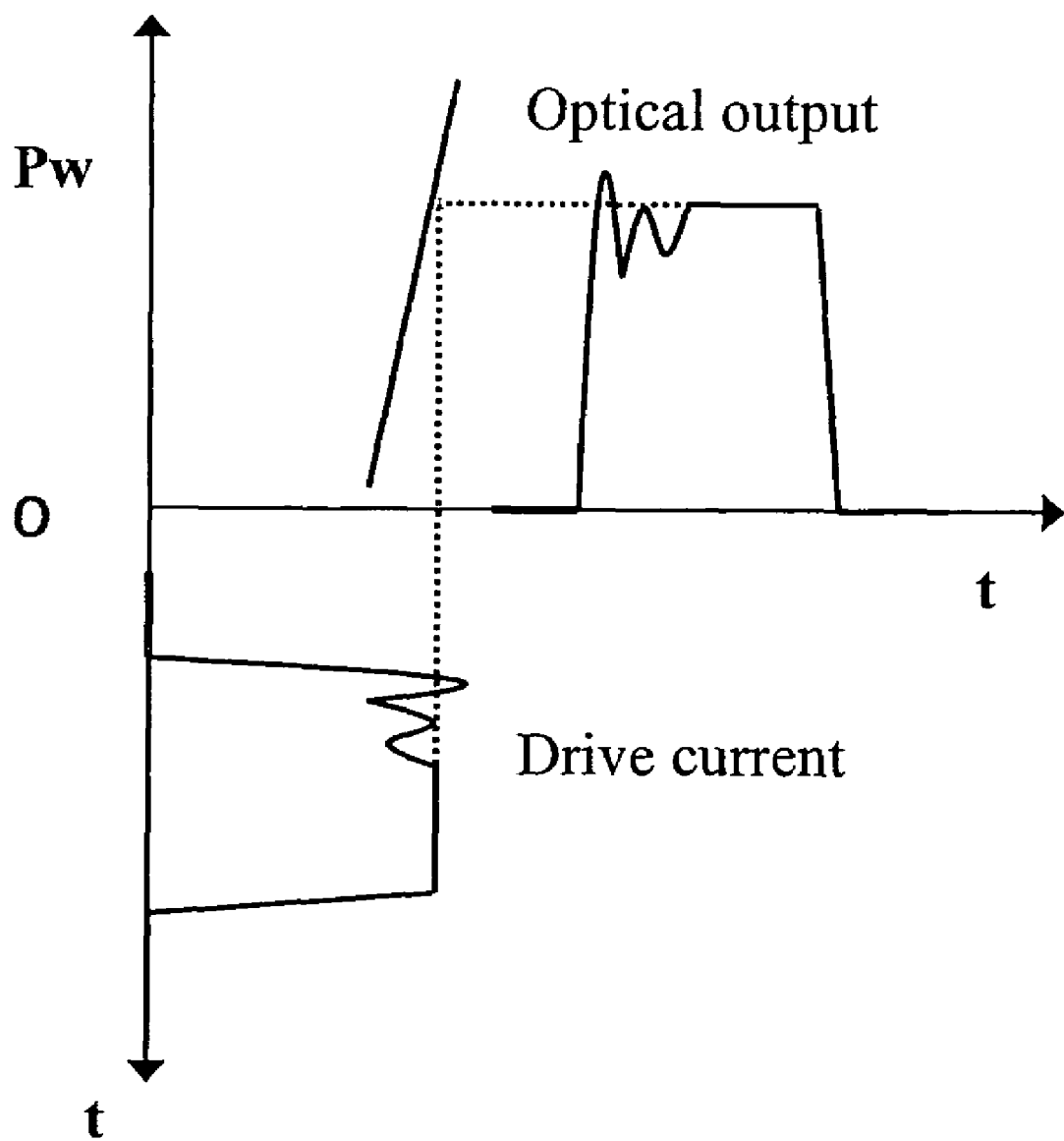
FIG. 4 is a diagram illustrating a relation of optical output from a drive current.

The first embodiment of the present invention will explain power compensation (fluctuation in frequency characteristic of drive) with reference to FIGS. 1 to 4, FIG. 7, FIG. 11, and FIG. 12. FIG. 3 illustrates flow of a recording signal until it is written into an optical disk. In this embodiment, a laser driver means the function to receive only a register instruction and output a current. The input data is encoded with an encoding circuit and is then converted with a write pulse generation circuit into the signal to form strategy for writing the encoded signal to a disk. Therefore, a power register is assumed to be provided within the write pulse generation circuit (FIG. 3). This signal is inputted to a laser driver. A current waveform from the laser driver is transferred in direct to the laser and is converted to a laser light emitting waveform (refer to FIG. 4).

At the time of recording, write parameters must be optimized between a recording medium and recording equipment. For example, when recording is conducted to a medium and such recording region is reproduced on the basis of the write parameters provided from a medium manufacturer described over the recording medium, operation such as optimization of the write parameters (hereinafter referred to as "study of write parameters") is required to provide least jitter of reproducing waveform which is an index of recording quality or least number of errors.

Figure 7:
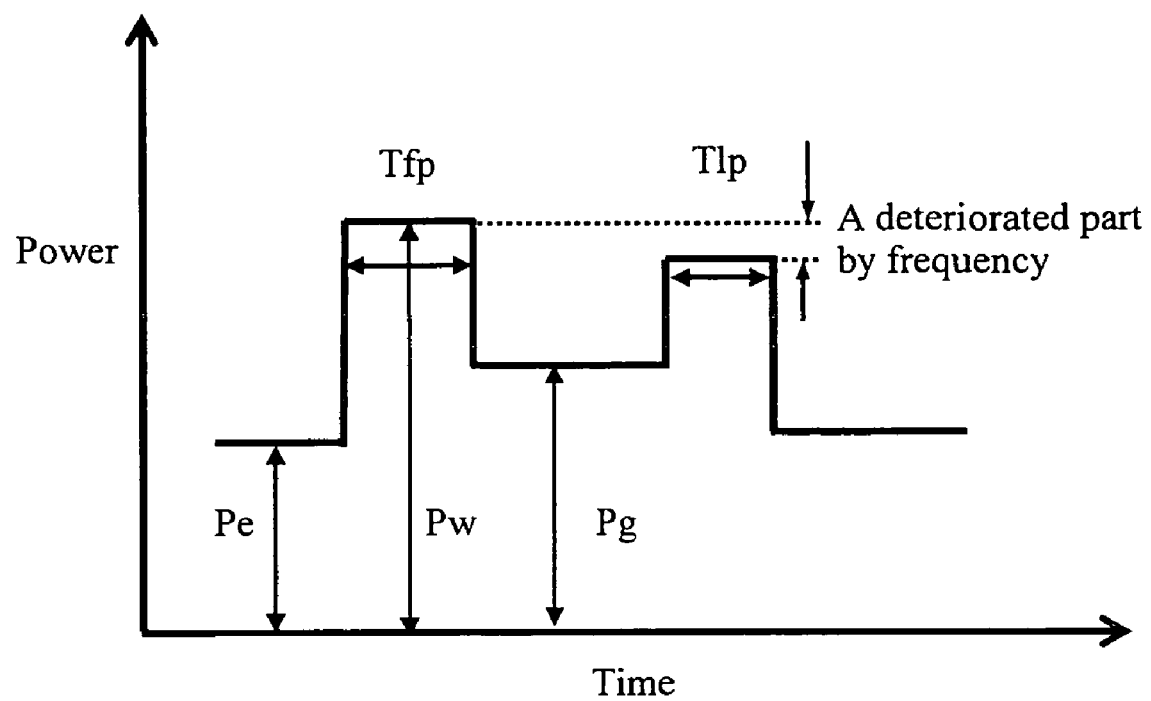
FIG. 7 is a diagram for explaining deterioration in frequency due to the laser driver of the last pulse of the write strategy (three levels) of non multi-pulse (also referred to as castle pulse).
Figure 8:
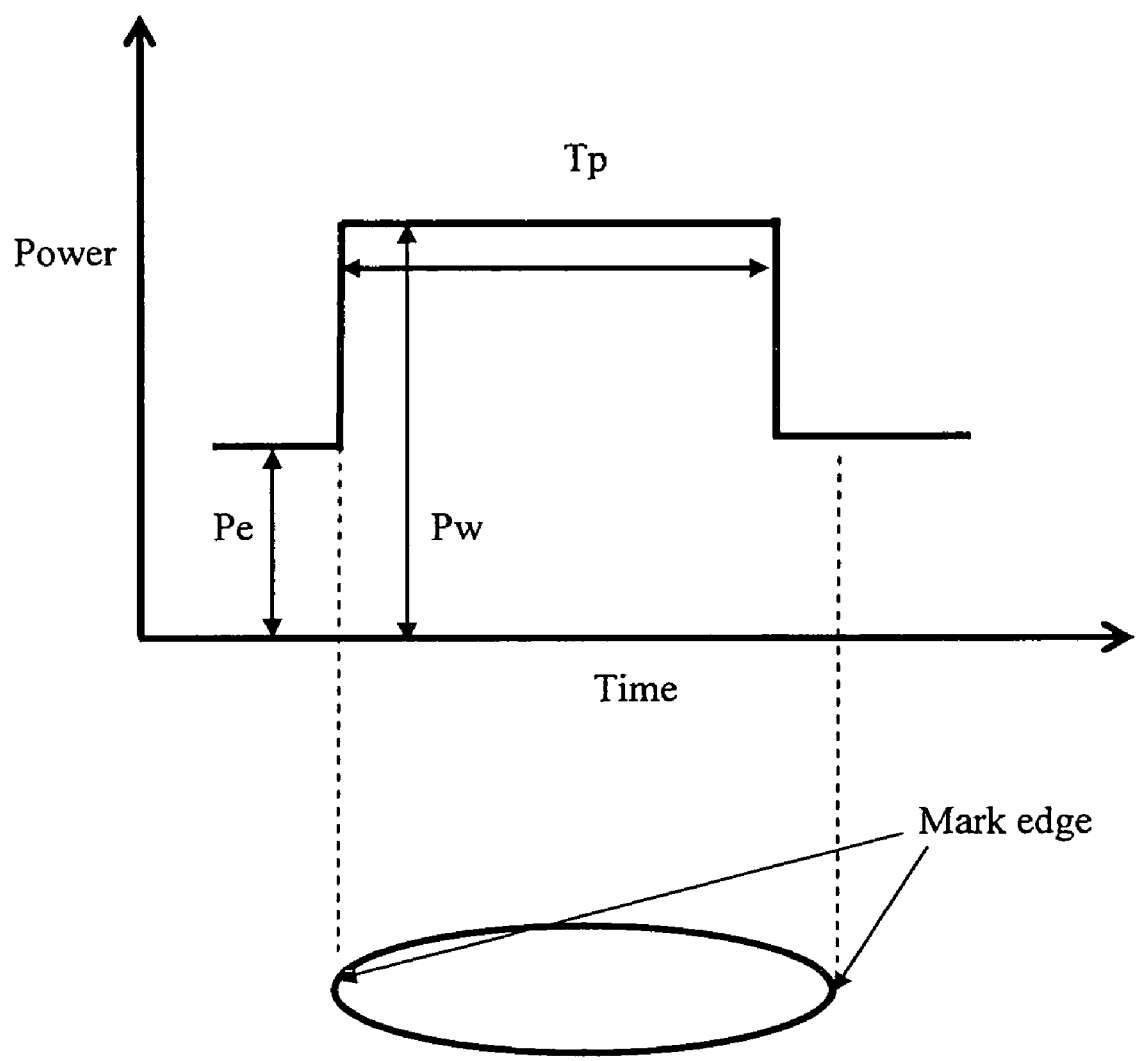
FIG. 8 is a diagram illustrating an example of write strategy of mono-pulse and a recording mark formed on the optical recording medium based on such strategy.
Figure 9:
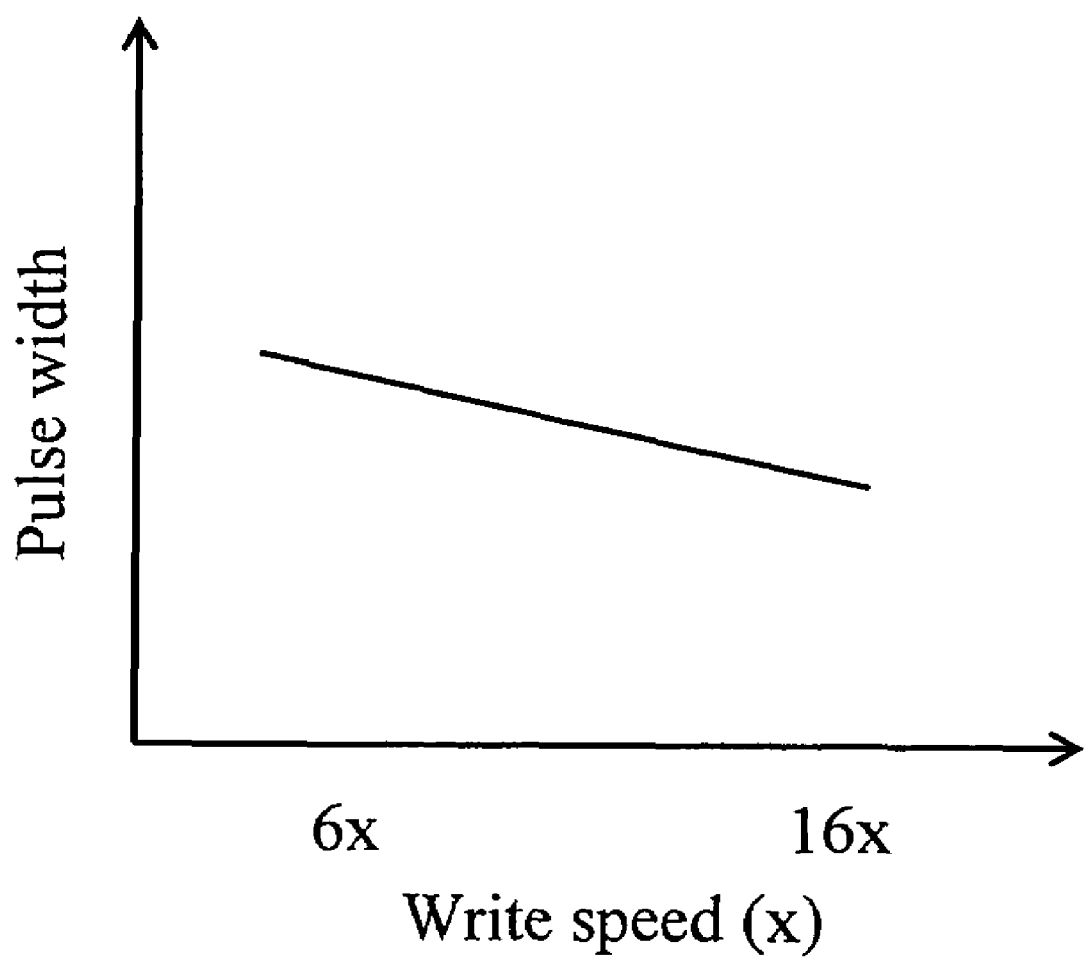
FIG. 9 illustrates a relation between a write speed of a DVD and the pulse width required for such DVD.
Figure 11:
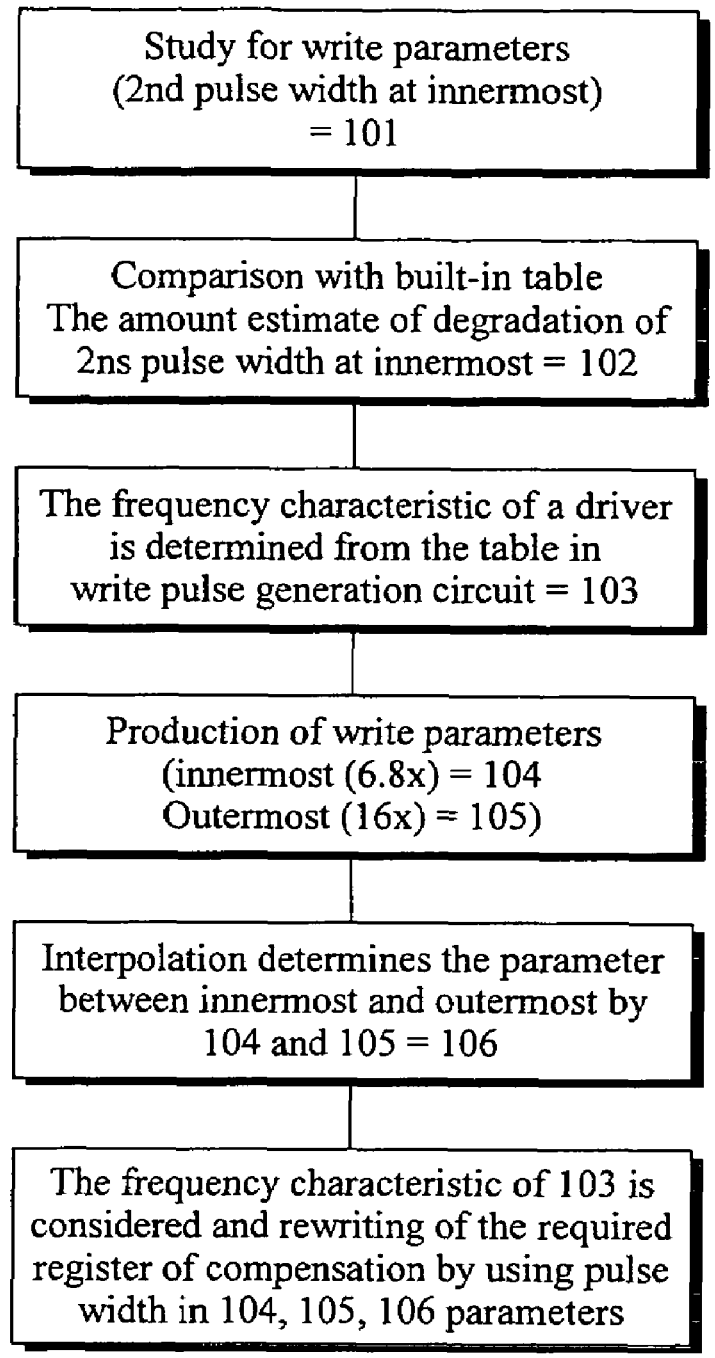
FIG. 11 illustrates the sequence for explaining a first embodiment.

For example, explanation will be made with reference to FIG. 7. In this case, the last pulse is the power level instruction which is identical to the first pulse, while the last pulse is narrower than the first pulse. Therefore, this last pulse is given the influence of the tr/tf characteristic of waveform and does not rise up to the instruction power level. The sequence for an example of the CAV system of 16 times velocity for DVD-RAM illustrated in FIG. 11 is considered as the method for solving the problem explained above. In this case, the first pulse is decided as 3 ns, while the last pulse as 2 ns.

1. Reproducing result 101 is obtained with recording operation using the pulse of 2 ns width at the innermost circumference for study of write parameters.
2. Amount of deterioration 102 of the 2 ns width pulse at the innermost circumference through comparison of result 101 with a built-in table (refer to FIG. 1).
3. Frequency characteristic of a driver is decided as 103 (refer to FIG. 2) through comparison of 102 with the table provided in the write pulse generation circuit.
4. Reproduction of write parameters
   (Innermost circumference (6.8×)=104
   Outermost circumference (16×)=105)
5. Parameters between the innermost circumference and outermost circumference are obtained with interpolation from 104 and 105=106.
6. Register is updated from amount of compensation of pulse width which required register compensation from the frequency characteristic of 103 among the parameters of 104, 105, and 106=107 (Refer to FIG. 12).

This sequence will be explained below in detail with reference to the accompanying drawings.

Frequency characteristic (dependence on frequency of attenuation in amplitude) of a laser driver may be assumed to have a plurality of characteristics resulting from change in characteristics of the driver because temperature characteristic within the range of specification and acceleration test will generate artificial deterioration by aging as illustrated in FIG. 2. Moreover, dependence on frequency of light emission waveform in accordance with fluctuation of the driver circuit itself and fluctuation of laser to be driven may also be assumed. A plurality of frequency characteristics explained above are stored within a storage means within the equipment. A plurality of frequency characteristics explained above corresponds to respective curves in FIG. 2.

Meanwhile, FIG. 1 illustrates a table indicating relation between pulse width of waveform and frequency characteristic thereof when the curves indicating respective frequency characteristics in FIG. 2 are defined as (a), (b), and (c). Here, A to E indicate setup values of LDD power register and the values for optimum compensation of power are stored. Accordingly, the register setup values of B to D can be obtained by estimating amount of deterioration for 2 ns in the step 2 of above sequence and by selecting any of the frequency characteristics (a) to (c) in the step 3.

Therefore, the register value of the last pulse can be updated and the power level which is identical to that of the first pulse can be outputted. High speed operation can be realized only with single study at the innermost circumference (or single study at the desired circumference) using also a laser driver including the region where the instructed light emitting power cannot be obtained (pulse width Tp≦1.25× (Tr+Tf)). With the method explained above, even when write parameters for the first write speed and the write parameters for at least one or more write speeds which are different from the first write speed are provided by a medium manufacturer in the form that these are recorded to the recording medium in the CAV recording system, respective waveforms can be reproduced faithfully and moreover the intermediate write speed between the first and second write speeds can also be interpolated without influence of waveform distortion. Moreover, this method can desirably be adapted not only to the CAV system but also to the CLV system. The write parameter means the parameter to form the write waveform such as shift width and pulse height of the multi-pulse or mono-pulse and of the first pulse or the last pulse.

Further, it is recommended, for selection of frequency characteristic, to use the pulse width in the region where frequency characteristic is deteriorated, namely in the region where gain is lowered when the pulse width exceeds the predetermined value in FIG. 2. When the pulse width is matched with the above value, the frequency characteristic being matched can be determined easily.

Figure 5:
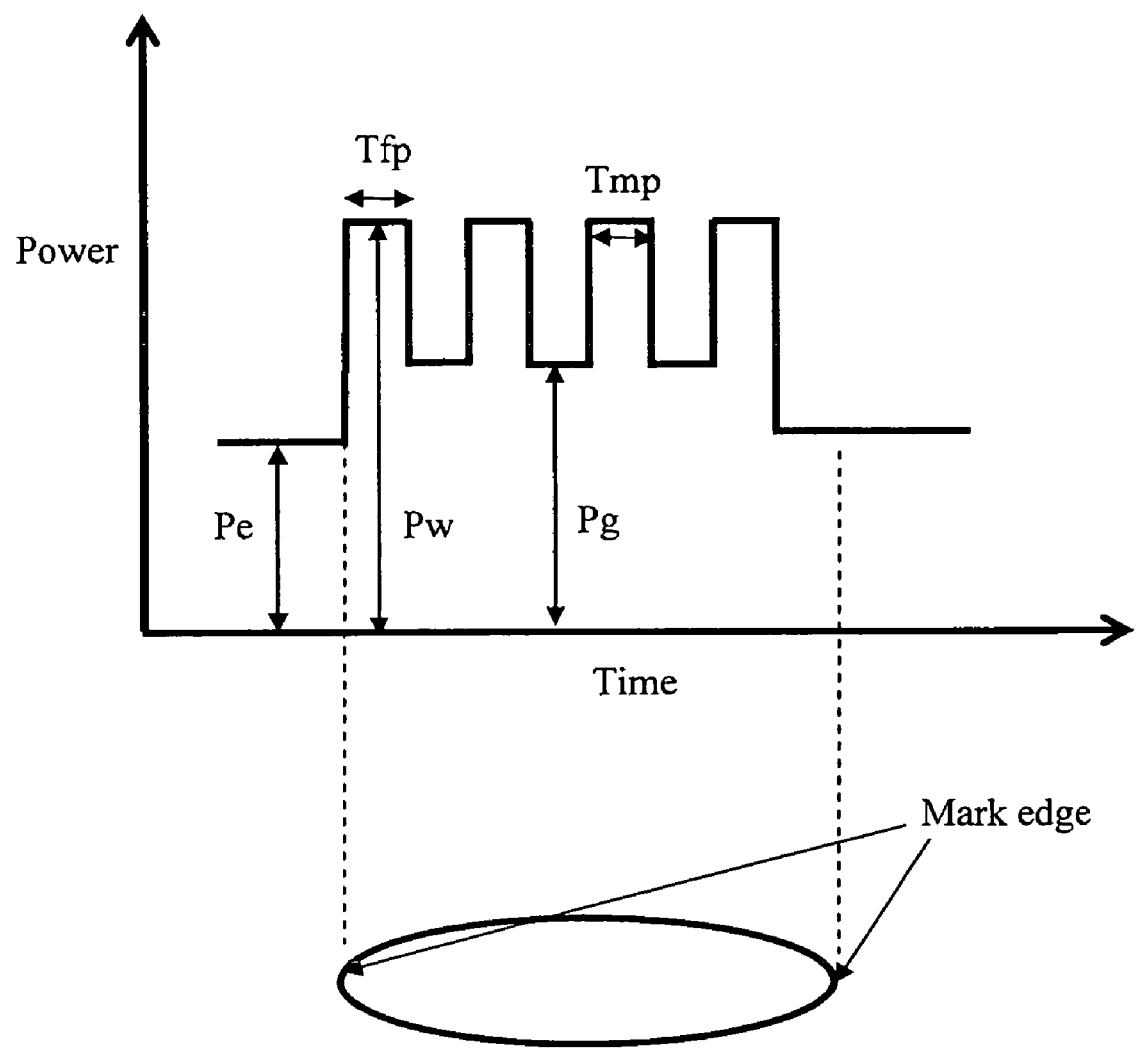
FIG. 5 is a diagram illustrating an example of light strategy (three levels) of a multi-pulse and a recording mark formed on an optical recording medium based on such strategy.
Figure 6:
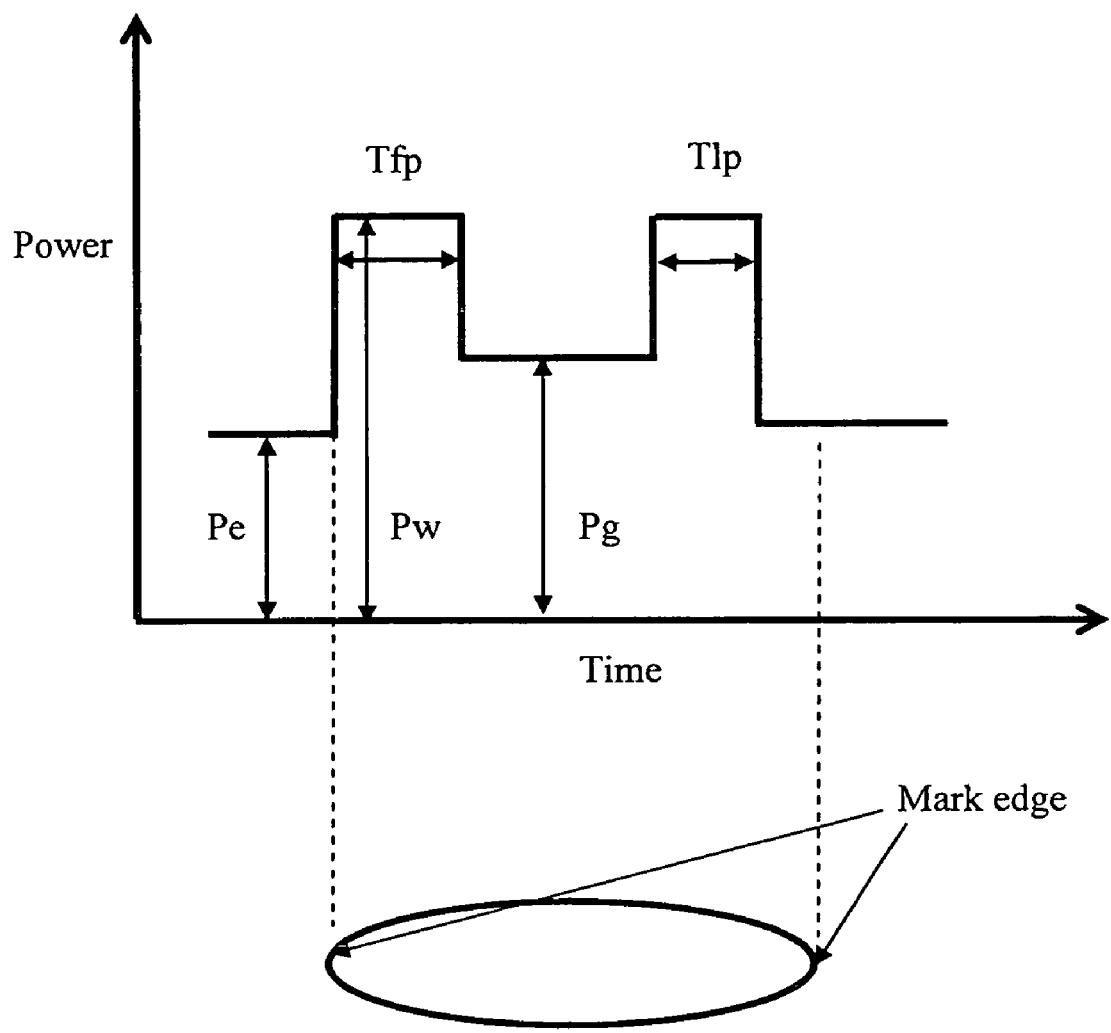
FIG. 6 is a diagram illustrating an example of the light strategy (three levels) of non multi-pulse (also referred to as castle pulse) and a recording mark formed on the optical recording medium based on this strategy.
Figure 10:
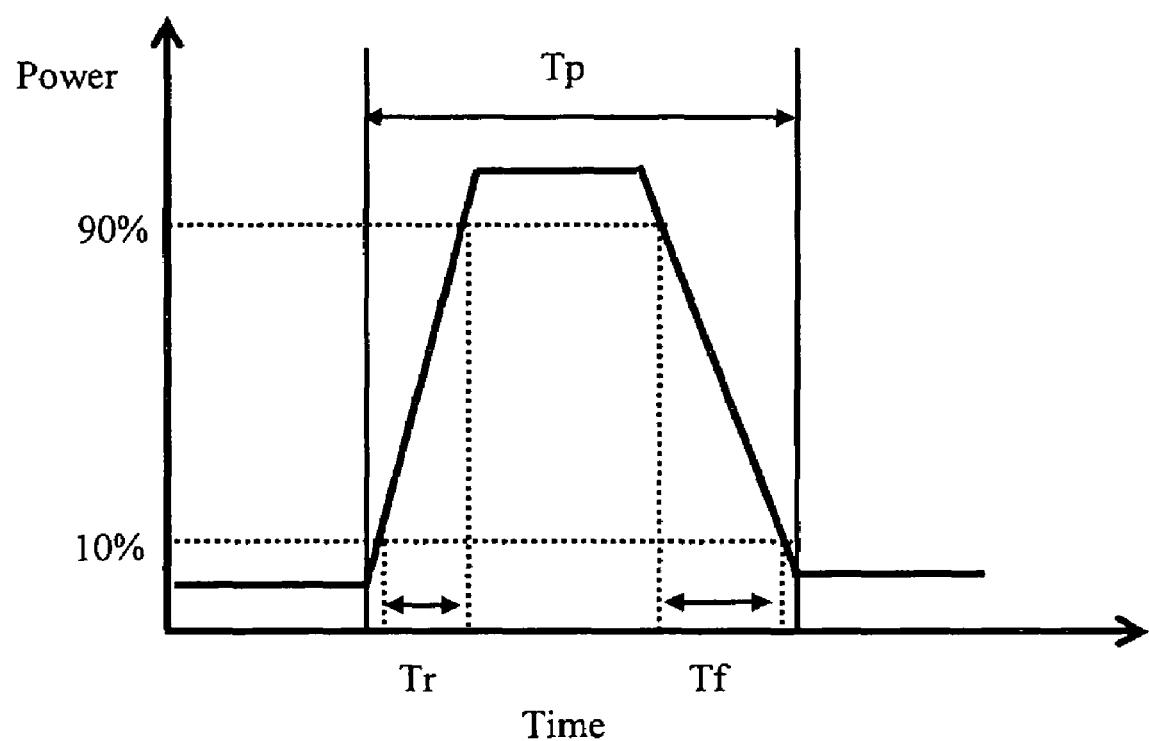
FIG. 10 is a diagram for explaining tr/tf of the laser driver and pulse width.

In the case where the multi-pulse as illustrated in FIG. 5 is included, it is recommended to satisfy at least any of Tfp≦1.25×(Tr+Tf) and Tmp≦1.25×(Tr+Tf) and in the case where the first pulse and the last pulse as illustrated in FIG. 6 are included, it is recommended to satisfy at least any of Tfp≦1.25×(Tr+Tf) and Tep≦1.25×(Tr+Tf). Moreover, in the case where the mono-pulse as illustrated in FIG. 10 is included, it is recommended to satisfy Tp≦1.25×(Tr+Tf).

Second Embodiment

Power Compensation (Compensation of Temperature Characteristic of Laser Drive)

The second embodiment for temperature change in the laser drive will be explained with reference to the sequence in FIG. 16 and with FIG. 17. Basically, the content identical to that in the first embodiment is omitted from explanation. In a laser driver manufactured using a semiconductor circuit, characteristic thereof is usually changed in accordance with temperature. With this temperature characteristic, a value of tr/tf explained previously also changes. Particularly, tr/tf of the laser driver which can realize high speed operation is not different from pulse width to a large extent and change in tr/tf gives large influence on the frequency characteristic. Moreover, when the more the high speed operation is improved, the larger temperature change becomes because a driver circuit tends to become large in the power consumption in this case. Change in the frequency characteristic due to change in temperature is previously measured and a temperature table corresponding to such temperature is also prepared (refer to FIG. 17). In the following explanation, the sequence in FIG. 16 will be used.

1. Temperature is always measured during the drive operation.=201

2. When temperature is changed from the temperature at the time of study of parameters, reference is made to the frequency characteristic from the temperature table.=202
3. Reference is made to the present write parameters.=203
4. Register is updated from amount of compensation of the pulse width which requires register compensation from the frequency characteristic of 202 among the parameters of 203.=204

The drive operation which is stable for temperature change can be provided by measuring, even during operation, temperature, changing the table to be selected in accordance with temperature, and changing the register of laser driver.

Third Embodiment

An embodiment for writing a frequency table of the laser driver will be explained with reference to FIG. 13 and FIG. 14. First, trial writing is executed using the mono-pulse as illustrated in FIG. 14 when the laser driver is delivered. When deterioration is generated due to the frequency characteristic as illustrated in FIG. 14 (the power is less than the instructed value), a shape of mark to be written changes and the reproducing signal thereof is also different. In this case, a driver frequency table of the pulse width for trial writing is generated previously corresponding to the required pulse width detected from the write speed and writer parameters. In this case, the driver characteristics showing artificial deterioration by aging because of temperature characteristic within the range of specification and acceleration test are also entered into the table, for taking temperature characteristic and deterioration by aging illustrated in the second embodiment into consideration. Accordingly, the frequency characteristics (a), (b), and (c) illustrated in FIG. 13, for example, can be obtained and these characteristics are also stored in the form of a table corresponding to fluctuation, temperature characteristic, and deterioration by aging of drive.

Fourth Embodiment

A way of trial writing in the actual drive will be explained with reference to FIG. 13 and FIG. 14. At the inner circumference for trial writing, trial writing is conducted using only one mono-pulse width corresponding to the frequency where the frequency characteristic of a laser driver is deteriorated. For example, when the trial writing is executed in the pulse width corresponding to F1 of FIG. 13, the reproducing signal differs due to deterioration in the pulse power. Therefore, an output value (gain) of the laser drive can be identified. Thereby, the present frequency characteristic (a), for example, can be identified, the frequency table can also be determined, and a deteriorated part by frequency can be compensated through reference to these results.

Figure 13:
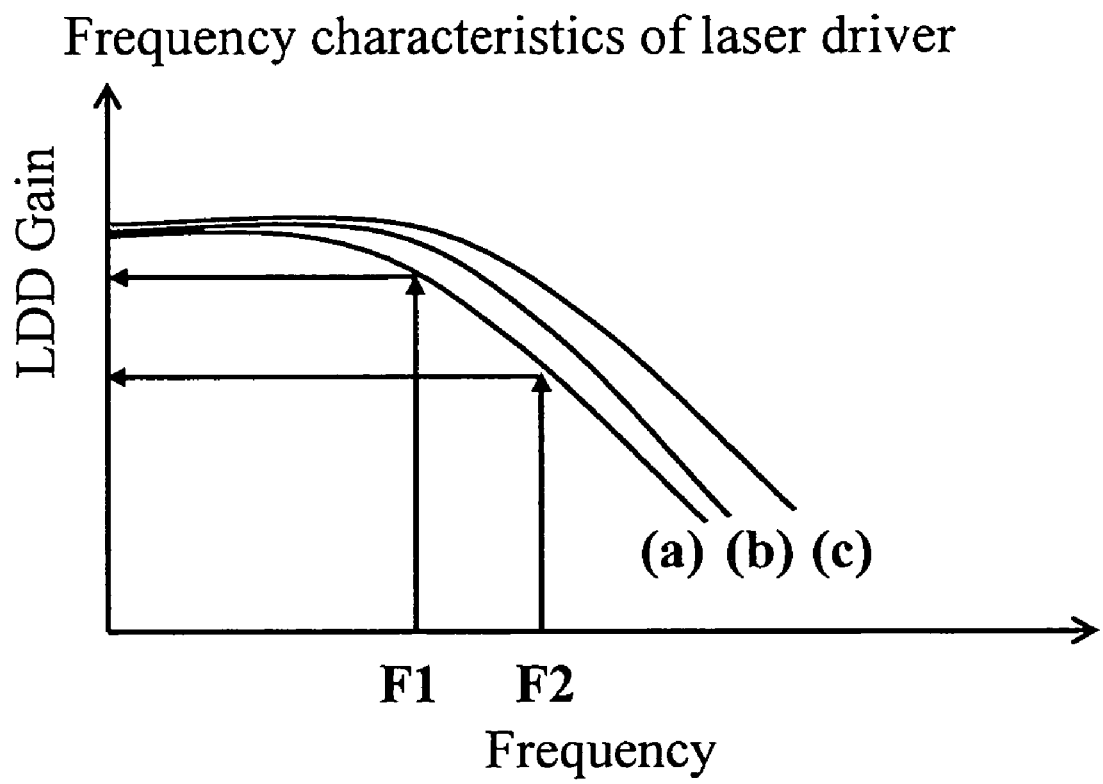
FIG. 13 is a diagram for explaining a means for identifying deterioration in frequency of the laser driver.
Figure 14:
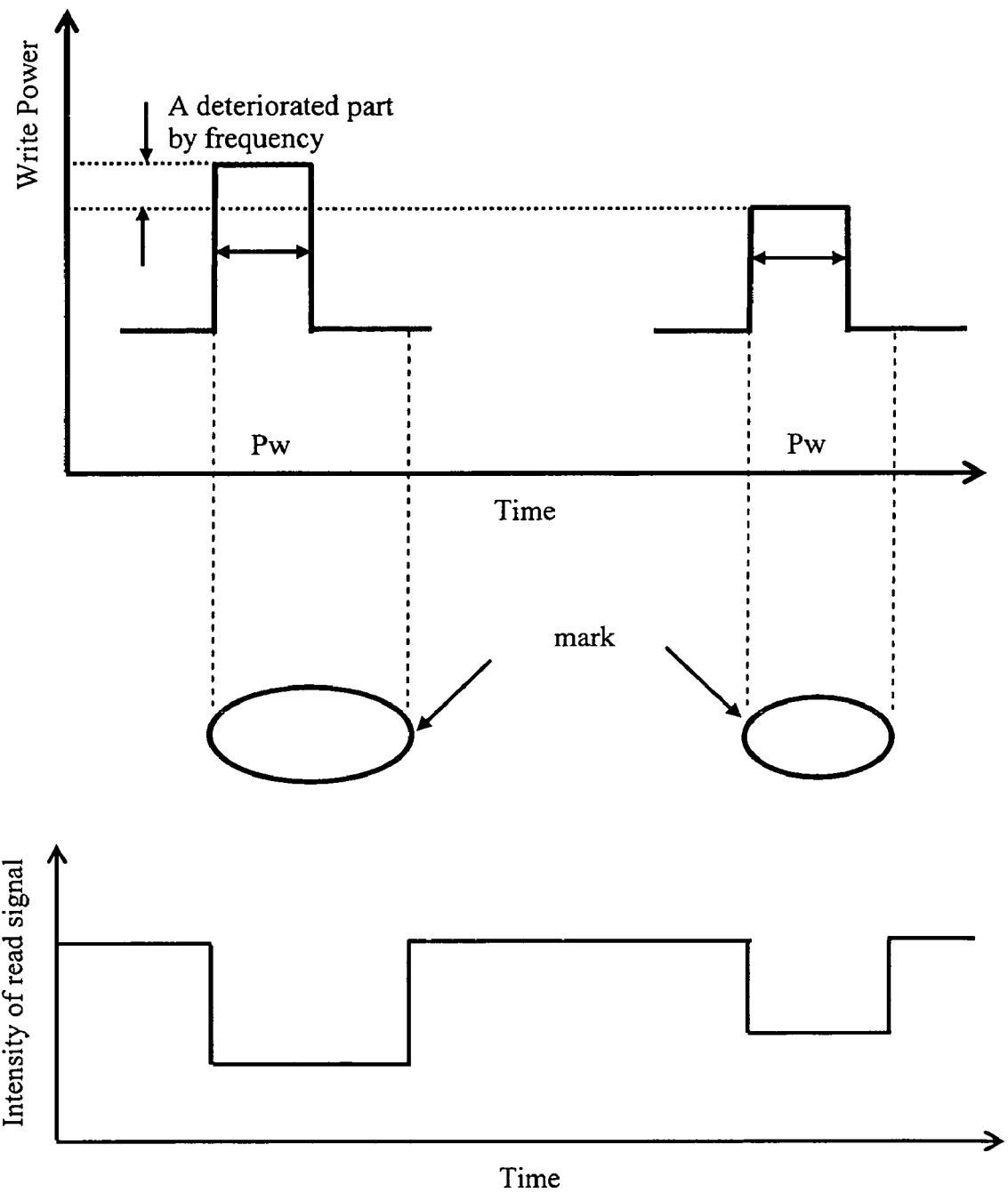
FIG. 14 is a diagram illustrating a mono-pulse recording pulse, a shape of recorded mark, and a reproducing (read) signal.

Moreover, at the time of conducting trial writing, the frequency table can be identified in higher accuracy by using two or more pulse widths like F1 and F2 in FIG. 13.

Fifth Embodiment

Figure 15:
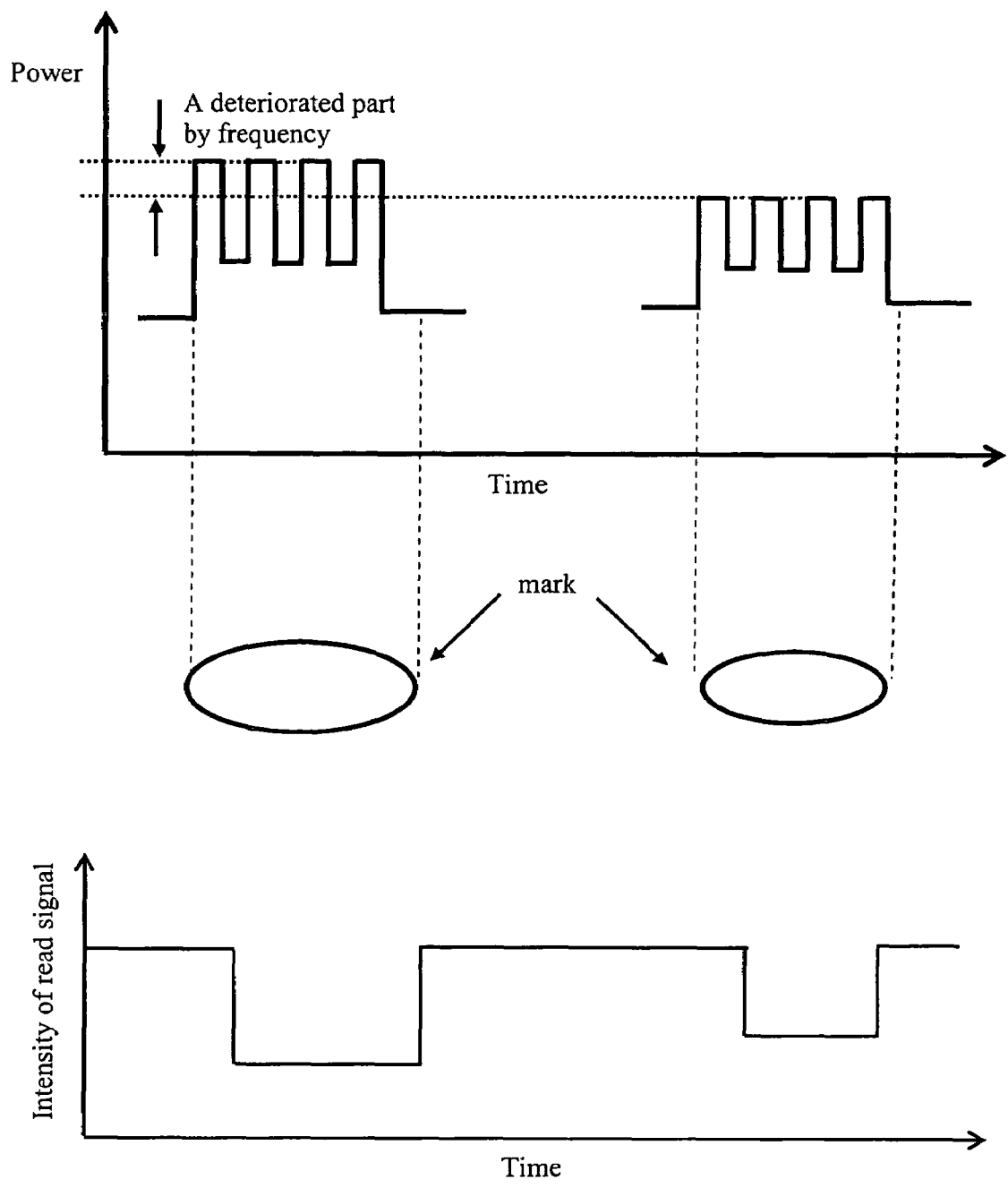
FIG. 15 is a diagram illustrating a multi-pulse recording pulse, a shape of recorded mark, and a reproducing signal.

Another way of trial writing in the actual drive which is different from that in the fourth embodiment will then be explained with reference to FIG. 13 and FIG. 15. At the inner circumference for trial writing, the trial writing is executed using only one multi-pulse including the pulse width corresponding to the frequency where the frequency characteristic of laser driver is deteriorated (refer to FIG. 15). For example, the trial writing is conducted, for example, using the multi-pulse including the pulse width corresponding to F1 in FIG. 13, an output value (gain) of laser driver can be identified because the reproducing signal is also different due to deterioration in the pulse power. Accordingly, the present frequency characteristic (a) can be identified, the frequency table can be determined, and a deteriorated part by frequency can also be compensated through reference to these results. Here, the frequency table can be identified with higher accuracy using two or more multi-pulses including the pulse width corresponding to F1 and F2 in FIG. 13 as in the case of the fourth embodiment. The multi-pulse is used in this embodiment, however, any type of pulse can also be used when it includes the pulse width corresponding to the frequency where the frequency characteristic is deteriorated.

Sixth Embodiment

Figure 18:
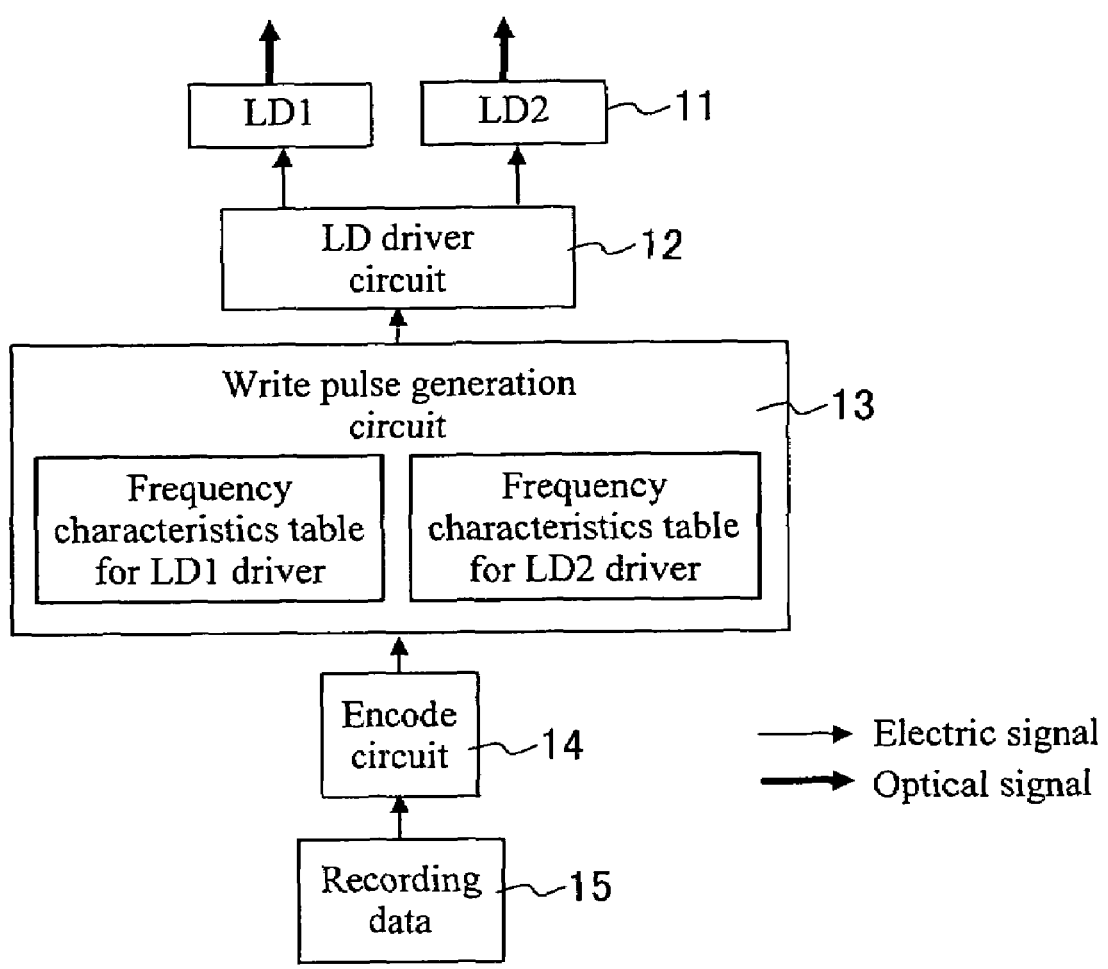
FIG. 18 is a diagram illustrating an example of drive of a plurality of LDs.

An embodiment in which the present invention is applied to a drive mounting two or more LDs will be explained with reference to FIG. 18. The LD is classified into LD1 and LD2 to simplify the explanation. When two or more LDs are to be driven with only one laser driver circuit, the distance between the LD and driver becomes longer, resulting in the possibility of remarkable deterioration of frequency characteristic because of factors such as limitation in layout of optical components. In this case, therefore, as is already explained above, the frequency characteristic when the distance becomes longer is previously obtained and stored in the form of a table. In this case, since the tables are prepared respectively for LD1 and LD2 as illustrated in FIG. 18, stable high speed operation can be insured corresponding to the case where wiring between LD and driver becomes longer due to limitation on the layout when the number of LDs increases other than the deterioration by aging and change in temperature as explained above.

What is claimed is:

1. An information recording method for recording information to a recording medium by irradiating a laser beam thereto, comprising the steps of:
    accessing a plurality of write parameters for the recording medium, as prerecorded on the recording medium by a medium manufacturer;
    conducting trial writing;
    obtaining a frequency characteristic of said laser beam by reproducing said information written by the trial writing; and
    determining a write strategy by comparing said frequency characteristic to said prerecorded write parameters, and selecting a write parameter on a basis of the frequency characteristic of said laser beam, and recording said information with said write strategy.

2. The information recording method according to claim 1, further comprising:
    storing within a storage means respective power register setup values of a plurality of frequency characteristics, and
    wherein said step for determining the write strategy by using said storage means comprises:
    determining a predetermined frequency characteristic from the plurality of said frequency characteristics,
    setting a power register of a laser driver in said predetermined frequency characteristic to the power register setup value of said storage means, and
    determining the write strategy.

3. The information recording method according to claim 2, wherein
    said trial writing is conducted using write strategy of pulse width corresponding to the frequency wherein said frequency characteristic of laser driver is deteriorated, and said step for determining said predetermined frequency characteristic determines the predetermined frequency characteristic on the basis of said pulse width.

4. The information recording method according to claim 2, wherein said storage means stores said power register setup values of a plurality of pulse widths in said respective frequency characteristics.

5. The information recording method according to claim 1, wherein said step for obtaining frequency characteristic of laser beam is conducted by obtaining a difference between light emission instruction of laser and actual light emission from the reproducing signal characteristic of the information written by said trial writing.

6. The information recording method according to claim 1, wherein recording of said information is conducted with the CAV (Constant Angular Velocity) system and write strategy parameters of a third write speed as an intermediate write speed between a first write speed and a second write speed can be guided from the first write strategy parameters in the stored first write speed and the second write strategy parameters in the stored second write speed.

7. The information recording method according to claim 1, wherein recording of said information is conducted with the CAV system, and the first write strategy parameters in the first write speed and the second write strategy parameters in the second write speed are previously written into said recording media.

8. The information recording method according to claim 1, wherein frequency characteristic of said laser beam can be obtained on the basis of temperature.

9. An information recording equipment, comprising:
a recording medium with a plurality of write parameters prerecorded on the recording medium by a medium manufacturer,
a laser source to guide a laser beam;
a driver circuit for driving said laser source,
a table for storing frequency characteristics of said driver circuit for driving said laser beam, and
a write strategy generation circuit for determining write strategy parameters by comparing said frequency characteristic stored in said table to said prerecorded write parameters from the recording media and selecting a write parameter on a basis of the frequency characteristic of said laser beam, and recording the write parameter to the recording medium.

10. The information recording equipment according to claim 9, wherein said table stores said power register setup values for a plurality of pulse widths in a plurality of frequency characteristics and said write strategy parameters are values of powers of said write strategy.

11. The information recording equipment according to claim 9, wherein a plurality of said laser sources are provided, and said table is provided for each one among a plurality of laser sources.

12. The information recording equipment according to claim 9, wherein
said write strategy is multi-pulse including the first pulse, repetitive pulse, and last pulse, and is at least any one of $$Tfp \leq 1.25 \times (Tr+Tf)$$

$$Tmp \leq 1.25 \times (Tr+Tf)$$

when time duration of said first pulse is Tfp, time duration of said repetitive pulse is Tmp, rise time (10-90%) of laser pulse of said information recording equipment is Tr, and fall time (10-90%) of laser pulse is Tf.

13. The information recording equipment according to claim 9, wherein
said write strategy includes the first pulse and the last pulse, and is at least any one of $$Tfp \leq 1.25 \times (Tr+Tf)$$

$$Tep \leq 1.25 \times (Tr+Tf)$$

when time duration of said first pulse is Tfp, time duration of said last pulse is Tep, rise time of laser pulse of said information recording equipment is Tr, and fall time of laser pulse is Tf.

14. The information recording equipment according to claim 9, wherein said write strategy includes mono-pulse, and $$Tp \leq 1.25 \times (Tr+Tf)$$

when time duration of said mono-pulse is Tp, rise time of laser pulse of said information recording equipment is Tr, and fall time of laser pulse is Tf.

15. An information recording method for recording information to a recording medium by irradiating a laser beam thereto, comprising the steps of:
accessing a plurality of write parameters for the recording medium, as prerecorded on the recording medium by a medium manufacturer;
conducting trial writing with a predetermined information;
obtaining a frequency dependence of attenuation of an amplitude of said laser beam by reproducing said predetermined information written by the trial writing; and
determining a write strategy by comparing said obtained frequency dependence of attenuation of the amplitude to said prerecorded write parameters and selecting a write parameter on a basis of said obtained frequency dependence of attenuation of the amplitude of said laser beam, and recording the information with said write strategy.

16. An information recording equipment, comprising:
a recording medium with a plurality of write parameters prerecorded on the recording media by a medium manufacturer,
a laser source to guide a laser beam,
a driver circuit for driving said laser source,
a table for storing frequency characteristics of said driver circuit for driving said laser beam, and
a write strategy generation circuit for determining write strategy parameters by comparing a content of said table and information on frequency dependence of attenuation of an amplitude of the laser source to said prerecorded write parameters from the recording medium and for recording said write strategy parameters.

* * * * *